US008656953B2

(12) United States Patent
Mohammed et al.

(10) Patent No.: US 8,656,953 B2
(45) Date of Patent: Feb. 25, 2014

(54) COMBINATION MANUAL/PNEUMATIC SHUT-OFF VALVE (75) Inventors: Balarabe Nuhu Mohammed, Union City, CA (US); Philip Barros, San Jose, CA (US); Raul A. Martin, Walnut Creek, CA (US); Mark A. Crockett, San Mateo, CA (US); Eric S. Sklar, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 13/409,944

(22) Filed: Mar. 1, 2012

(65) Prior Publication Data
US 2012/0161043 A1 Jun. 28, 2012

Related U.S. Application Data (62) Division of application No. 11/678,251, filed on Feb. 23, 2007, now Pat. No. 8,127,783, which is a division of application No. 10/758,968, filed on Jan. 16, 2004, now abandoned.

(60) Provisional application No. 60/440,928, filed on Jan. 17, 2003.

(51) Int. Cl.
*F15B 13/04* (2006.01)
(52) U.S. Cl.
USPC ............... 137/625.24; 137/596; 251/89.5; 251/113
(58) Field of Classification Search
USPC ............ 137/625.21, 625.22, 625.24, 596; 251/89, 89.5, 111, 113
See application file for complete search history.

(56) References Cited

U.S. PATENT DOCUMENTS 1,288,356 A * 12/1918 Woods .......................... 222/486
1,465,568 A * 8/1923 Taylor ...................... 137/625.24
(Continued)

FOREIGN PATENT DOCUMENTS

CN 2527809 12/2005
JP 6-194203 7/1994
(Continued)

OTHER PUBLICATIONS

Urdaneta, Nelson, "Eliminating the effects of gas-system pressure transients", reprinted with revisions in: *Solid State Technology*, Feb. 2001.

(Continued)

*Primary Examiner* — William McCalister
(74) *Attorney, Agent, or Firm* — Fish & Richardson P.C.

(57) ABSTRACT

A method of preventing a mass flow controller from participating in crosstalk in an array of mass flow controllers is described. The method includes sensing and providing a signal indicative of a fluid pressure inside of a mass flow controller with a pressure sensor contained within the mass flow controller, determining a response of a control valve to a rapid pressure perturbation at the inlet of the mass flow controller using the signal indicative of the fluid pressure to avoid overcompensation for the rapid pressure perturbation, and adjusting a control valve contained within the mass flow controller downstream of the pressure sensor, based on the determined response, so that the mass flow controller avoids overcompensating for the rapid pressure perturbation. The pressure sensor is positioned such that the pressure sensor is sensitive to rapid pressure perturbations at the inlet of the mass flow controller.

15 Claims, 6 Drawing Sheets

(56) References Cited

U.S. PATENT DOCUMENTS

| | | | |
|---|---|---|---|
| 2,262,293 A * | 11/1941 | Reinor et al. | 222/410 |
| 2,319,347 A * | 5/1943 | Reed | 137/625.24 |
| 2,620,195 A * | 12/1952 | Gillerstrom | 137/614.2 |
| 2,700,984 A * | 2/1955 | Gleasman | 137/625.11 |
| 3,515,502 A * | 6/1970 | Coordes | 417/178 |
| 3,556,152 A * | 1/1971 | Nystrand | 137/625.21 |
| RE29,322 E | 7/1977 | Nelson | |
| 4,230,299 A | 10/1980 | Pierce, Jr. | |
| 4,687,020 A | 8/1987 | Doyle | |
| 4,702,277 A | 10/1987 | Ollivier | |
| 4,705,075 A * | 11/1987 | Ray | 137/625.47 |
| 4,706,929 A | 11/1987 | Kalaskie et al. | |
| 4,815,692 A | 3/1989 | Loiseau et al. | |
| 4,819,682 A | 4/1989 | Van Marcke | |
| 5,062,446 A | 11/1991 | Anderson | |
| 5,129,418 A | 7/1992 | Shimomura et al. | |
| 5,141,021 A | 8/1992 | Shimomura et al. | |
| 5,293,778 A | 3/1994 | Schneiter | |
| 5,303,731 A | 4/1994 | Vavra et al. | |
| 5,439,026 A | 8/1995 | Moriya et al. | |
| 5,524,084 A | 6/1996 | Wang et al. | |
| 5,664,759 A | 9/1997 | Evans et al. | |
| 5,755,424 A | 5/1998 | Ryd | |
| 5,911,238 A | 6/1999 | Bump et al. | |
| 5,925,829 A | 7/1999 | Laragione | |
| 5,944,048 A | 8/1999 | Bump et al. | |
| 5,966,499 A | 10/1999 | Hinkle et al. | |
| 5,967,186 A | 10/1999 | Grueninger | |
| 6,062,246 A | 5/2000 | Tanaka et al. | |
| 6,068,016 A | 5/2000 | Manofsky et al. | |
| 6,089,531 A | 7/2000 | Young | |
| 6,119,710 A | 9/2000 | Brown | |
| 6,138,708 A | 10/2000 | Waldbusser | |
| 6,216,726 B1 | 4/2001 | Brown et al. | |
| 6,227,223 B1 | 5/2001 | Crochet et al. | |
| 6,250,605 B1 | 6/2001 | Young | |
| 6,269,692 B1 | 8/2001 | Drexel et al. | |
| 6,343,617 B1 | 2/2002 | Tinsley et al. | |
| 6,363,958 B1 | 4/2002 | Ollivier | |
| 6,425,281 B1 | 7/2002 | Sheriff et al. | |
| 6,591,850 B2 | 7/2003 | Rocha-Alvarez et al. | |
| 6,601,005 B1 | 7/2003 | Eryurek et al. | |
| 6,640,822 B2 | 11/2003 | Tinsley et al. | |
| 6,681,787 B2 | 1/2004 | Tinsley et al. | |
| 6,712,084 B2 | 3/2004 | Shajii et al. | |
| 6,714,878 B2 | 3/2004 | Vyers | |
| 6,810,308 B2 | 10/2004 | Shajii et al. | |
| 6,814,096 B2 | 11/2004 | Vyers et al. | |
| 6,898,558 B2 | 5/2005 | Klekotka | |
| 6,932,098 B2 | 8/2005 | Shajii et al. | |
| 7,073,392 B2 | 7/2006 | Lull et al. | |
| 8,127,783 B2 | 3/2012 | Balarabe et al. | |
| 2002/0046612 A1 | 4/2002 | Mudd | |
| 2002/0053403 A1 | 5/2002 | Tsourides | |
| 2002/0117212 A1 | 8/2002 | Vyers et al. | |
| 2002/0139418 A1 | 10/2002 | Tinsley et al. | |
| 2002/0179149 A1 | 12/2002 | Ohmi et al. | |
| 2002/0198668 A1 | 12/2002 | Lull et al. | |
| 2003/0234039 A1 | 12/2003 | Shajii et al. | |
| 2003/0234048 A1 | 12/2003 | Shajii et al. | |
| 2003/0236592 A1 | 12/2003 | Shajii et al. | |
| 2003/0236638 A1 | 12/2003 | Shajii et al. | |
| 2003/0236643 A1 | 12/2003 | Shajii et al. | |
| 2004/0083807 A1 | 5/2004 | Mudd et al. | |
| 2005/0000570 A1 | 1/2005 | Mohammed et al. | |

FOREIGN PATENT DOCUMENTS

| | | |
|---|---|---|
| JP | 2001-330943 | 10/2001 |
| WO | WO01/04585 | 7/2000 |
| WO | WO00/63757 | 10/2000 |
| WO | WO02/086632 | 10/2002 |

OTHER PUBLICATIONS

Applied Materials, Inc., Office Action dated May 21, 2009 in the corresponding Taiwan Application No. 93101259 and its translation, 10 pages.

Taiwan Patent Examiner, Office Action dated Jul. 7, 2010 in the corresponding Taiwanese Application No. 93101259 and its English translation, 12 pages.

Taiwan Patent Examiner, Supplemental Office Action dated Jul. 7, 2010 in the corresponding Taiwanese Application No. 93101259 and its English translation, 6 pages.

Korean Patent Examiner, Preliminary Rejection in Korean Application No. 10-2004-0003547, dated Jan. 11, 2012, 9 pages.

* cited by examiner

_COMBINATION MANUAL/PNEUMATIC SHUT-OFF VALVE_

RELATED APPLICATION

This application is a divisional of U.S. application Ser. No. 11/678,251, filed Feb. 23, 2007, which will issue as U.S. Pat. No. 8,127,783, which is a divisional of U.S. application Ser. No. 10/758,968, filed Jan. 16, 2004, which claims the benefit of U.S. Provisional Application No. 60/440,928, filed Jan. 17, 2003. The contents of U.S. application Ser. No. 10/758,968 and U.S. Provisional Application No. 60/440,928 are incorporated here by reference in their entirety.

TECHNICAL FIELD

The present invention relates to process fluid control assemblies, and more particularly to shut-off valves for process fluid control assemblies.

BACKGROUND

Almost every process step during semiconductor wafer processing that adds, alters or removes material on silicon wafers utilizes one or more process fluids. These process fluids range from inert fluids, such as helium, to toxic and corrosive fluids, such as chlorine. Consequently, semiconductor wafer processing requires sophisticated fluid delivery systems that can delivery a variety of process fluids in precise amounts to a wafer processing chamber.

In a typical processing assembly, the process fluids are contained in individual pressurized cylinders that are under the control of a facility system external to the processing equipment. The fluids are then supplied to the equipment through tubing, and a fluid panel controls the flow of fluid from the point of connection to that tubing to the process chamber. The fluid panel is commonly divided into individual process fluid control assemblies, each of which is a complete assembly of components (such as valves, filters, fluid purifiers, pressure regulators, and transducers) for one fluid stream.

Figure 1:
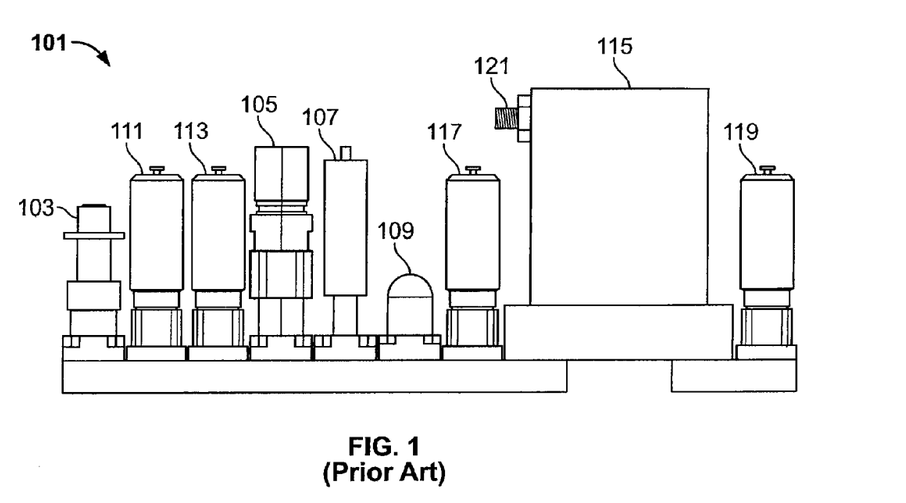
FIG. 1 is a schematic illustration of a prior art process fluid control assembly.

FIG. 1 shows a process fluid control assembly 101 configuration in a typical prior art fluid panel. The configuration shown is of the type commonly used for toxic fluids, such as chlorine. The process fluid control assembly comprises a manual diaphragm valve 103 that serves as a safety device by allowing the flow of fluid through the assembly to be manually turned off for maintenance and service. Fluid pressure is controlled by a pressure regulator 105 and a pressure transducer 107. A filter 109 is provided to remove impurities from the fluid stream. First 111 and second 113 pneumatic valves operate to allow the flow of fluid to be remotely turned on and off by sending an electronic signal to both pneumatic valves and to the mass flow controller (MFC) 115, the latter of which provides precision control of fluid flow through the process fluid control assembly. Third 117 and fourth 119 pneumatic valves are provided so that the mass flow controller can be purged for maintenance. (The third and fourth pneumatic valves are typically not present in process fluid control assemblies of this type which are designed for use with inert fluids.) A communication port 121 is provided on the mass flow controller to allow it to be accessed and controlled remotely.

While the process fluid control assembly configuration of FIG. 1 allows the fluid panel to provide good control over fluid delivery to the wafer processing chamber, the number of components in this configuration causes the fluid panel to be exceedingly bulky and complex. This is especially so for wafer processing chambers that require several different process fluids.

There is thus a need in the art for process fluid control assembly and fluid panel configurations that are more compact and/or have fewer components, without sacrificing functionality, ease of serviceability and modularity of the configuration. These and other needs are met by the devices and methodologies disclosed herein.

SUMMARY

In one aspect, a device is provided which comprises an actuator and a handle. The actuator is adapted to move the device, in response to a pneumatic signal, from a first state (which may be a closed state) into a second state (which may be an open state), and the handle is adapted to move the device from the second state into the first state regardless of whether a pneumatic signal is present. The device may be, for example, a fluid control assembly equipped with a valve, wherein the valve is closed in the first state and is open in the second state, or it may be a pneumatically driven latch, wherein the latch is closed in the first state and is open in the second state. The handle is typically manually driven, as by rotating it about an axis, and the actuator is typically pneumatically driven. The device may comprise a diaphragm and a valve seat, and the actuator may be adapted to move the device, in response to a pneumatic signal, from a first state in which the diaphragm is pressed against the valve seat, to a second state in which the diaphragm is not pressed against the valve seat. The device may further comprise a valve chamber having a fluid inlet and a fluid outlet, wherein the diaphragm and the valve seat form a seal between the fluid inlet and the fluid outlet. In such embodiments, the fluid inlet and the fluid outlet will typically be in open communication with each other when the device is in the second state.

In another aspect, a combination manual/pneumatic valve for a process fluid control assembly is provided. The valve comprises (a) a housing, (b) a valve chamber disposed in the housing which has a fluid inlet and a fluid outlet and which may also contain a diaphragm and a valve seat, (c) a pneumatically driven actuator which is adapted to move the valve, in response to a pneumatic signal, from a first state in which the flow of fluid between the fluid inlet and the fluid outlet is stopped, into a second state in which flow of fluid between the fluid inlet and the fluid outlet is permitted; and (d) a handle adapted to move the valve from the second state into the first state, regardless of whether a pneumatic signal is present at the actuator. When the valve is in the first state, the diaphragm and the valve seat typically form a seal between the fluid inlet and the fluid outlet; conversely, when the valve is in the second state, the fluid inlet and the fluid outlet are typically in open communication with each other. The valve may further comprise an expansion chamber having a piston therein which is adapted to move the diaphragm from a position in which it is pressed against the valve seat to a different position in response to a signal, as, for example, by advancing along a longitudinal axis in a first direction, and the expansion chamber may be equipped with an inlet adapted to introduce pressurized air into the expansion chamber, and an outlet adapted to exhaust the expansion chamber. The valve may also comprise a spring adapted to maintain a compressive force on the diaphragm.

The handle of the valve may be equipped with a threaded cylinder that rotatingly engages a complementarily threaded aperture in the housing, thereby moving the valve into the first state. The handle of the valve may have a shaft that is equipped with a passageway defined by first and second apertures that are in open communication with each other, and wherein the first aperture is in open communication with the expansion chamber. The second aperture may be adjustable, by rotation of the handle, from a first position in which it is in open communication with the inlet, to a second position in which it is in open communication with the outlet. The valve seat may be an o-ring and may be disposed about the fluid inlet such that the actuator compresses the diaphragm against the o-ring when the valve is in the first state.

In some configurations, the valve is adapted such that a spring holds the diaphragm against the valve seat when the valve is in the first state and the pneumatic chamber and piston counteract the spring to allow the diaphragm to move so that the valve can enter the second state. The disconnection of the pneumatic chamber from the inlet and the connection of the pneumatic chamber to the outlet (accomplished by the single act of rotating the handle), places the valve in a closed position and disables the pneumatic control. Such a configuration may also include a mechanical linkage such that the rotation of the handle causes axial force to be applied to the diaphragm, holding it against the seat with a force in addition to that provided by the spring.

In still another aspect, a process fluid control assembly is provided herein which comprises first and second pneumatic valves, a mass flow controller, and a combination manual/pneumatic valve, wherein the first pneumatic valve is upstream from the mass flow controller, wherein the second pneumatic valve is downstream from the mass flow controller, and wherein the combination valve is upstream from the first pneumatic valve.

In yet another aspect, a fluid panel is provided herein which comprises a substrate, and a plurality of process fluid control assemblies disposed on said substrate. Each of the plurality of process fluid control assemblies comprises first and second pneumatic valves, a mass flow controller, and a combination manual/pneumatic valve. The first pneumatic valve is upstream from the mass flow controller, the second pneumatic valve is downstream from the mass flow controller, and the combination valve is upstream from said first pneumatic valve.

These and other aspects are described in greater detail below.

DESCRIPTION OF DRAWINGS

Like reference symbols in the various drawings indicate like elements.

DETAILED DESCRIPTION

As used herein, the term "fluid" is meant to include both liquids and gases.

It has now been found that the length of process fluid control assemblies, and hence the size of fluid panels, can be reduced by combining the functionalities of a manual valve and a pneumatic valve (such as the first pneumatic valve 111 of FIG. 1) into a single valve. The resulting combination manual/pneumatic valve reduces the length of the process fluid control assembly and the size of the fluid panel without adversely affecting the serviceability of the fluid panel or process fluid control assembly and the modularity thereof. It has also been found that further reductions in the length of the process fluid control assembly and the size of the fluid panel can be obtained, again without adversely affecting the serviceability of the fluid panel or process fluid control assembly and the modularity thereof, by combining the functionalities of the pressure regulator, pressure transducer, and filter of a conventional process fluid control assembly such as that shown in FIG. 1 into the mass flow controller. These and other aspects and features of the systems and devices disclosed herein are discussed in greater detail below.

Figure 2:
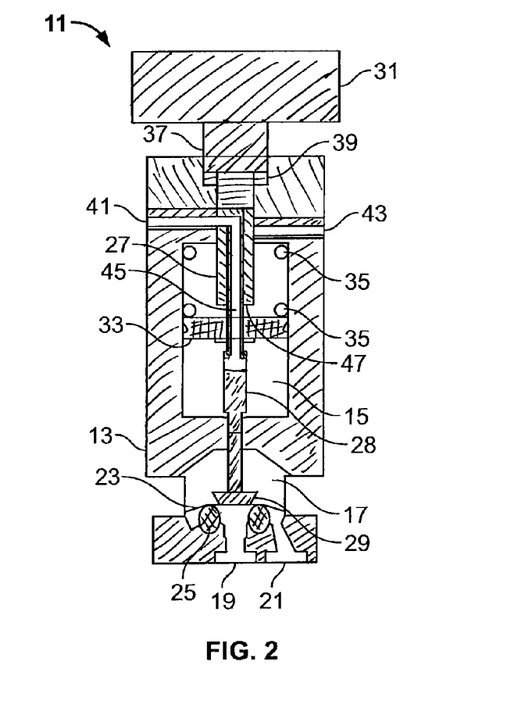
FIG. 2 is a schematic illustration of a combination valve/manual handle (shown in a manually enabled, pneumatically closed position) in accordance with the teachings herein.
Figures 3, 4:
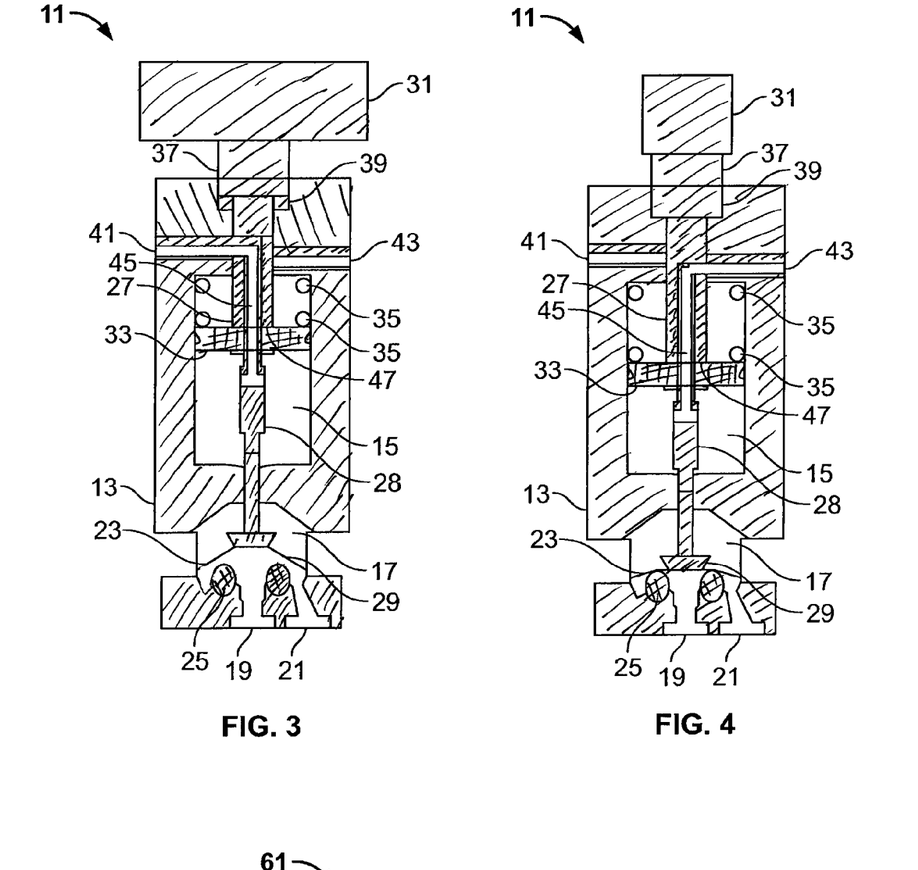
FIG. 3 is a schematic illustration of a combination valve/manual handle (shown in a manually enabled, pneumatically open position) in accordance with the teachings herein.
FIG. 4 is a schematic illustration of a combination valve/manual handle (shown in a manually disabled valve with a pneumatic signal to open the valve being provided, but with the valve closed) in accordance with the teachings herein.

FIGS. 2-4 illustrate one embodiment of a combination manual/pneumatic valve 11 made in accordance with the teachings herein. The combination valve has a housing 13 which is typically cylindrical and which contains a centrally disposed expansion chamber 15 and a centrally disposed valve chamber 17. The expansion chamber and the valve chamber are typically coaxially aligned. The valve chamber has a process fluid inlet 19 and a process fluid outlet 21 defined therein, and is fitted with a diaphragm 23 and a valve seat 25 that cooperate to control the flow of fluid into and out of the valve chamber. Thus, when the diaphragm is spaced apart from the valve seat, the process fluid inlet and process fluid outlet are in open communication, and fluid is permitted to flow into and out of the valve chamber. However, when the diaphragm is compressed against the valve seat (that is, when the valve is if the "off" position), the process fluid inlet and process fluid outlet are isolated from each other, and the flow of fluid through the valve chamber is terminated. Typically, the valve seat will comprise an elastomeric material that has sufficient compliance to achieve a tight seal when a sufficient compressive force is applied to it, yet has sufficient resiliency to return to its original shape when the compressive force is removed. The valve seat will most typically comprise a fluoroelastomer which may be coated with a perfluoropolymer, given the chemical resistance of the latter to commonly used process fluids such as chlorine.

The expansion chamber 15 of the valve is typically cylindrical and has a coaxially aligned and longitudinally extending shaft 27 disposed therein. The shaft is connected on one end via a mandrel 28 to an actuator 29 which makes contact with the diaphragm 23, and terminates on the other end in a handle 31. The shaft is fitted with a spring-loaded piston 33 which is maintained under a minimum compressive force by means of a spring 35.

The handle is fitted with a threaded male cylinder 37 that rotationally engages a complementary threaded female receptacle 39. The handle is typically designed to be operated with an ergonomically reasonable amount of force. Consequently, as the handle is rotated in the (typically clockwise) disabling direction, the shaft 27 is advanced along the longitudinal axis such that the actuator compresses the diaphragm 23 against the valve seat 25, thereby cutting off the flow of fluid between the process fluid inlet 19 and the process fluid outlet 21 and manually placing the valve in the disabled position. Conversely, when the handle is rotated in the (typically counterclockwise) enabling direction, the shaft is withdrawn along the longitudinal axis, and the valve is returned to a pneumatically controlled state. In this state, and in the absence of a pneumatic signal, the spring 35 continues to force the piston 33, the shaft 27 coupled directly thereto, and the actuator 29 against the diaphragm 23, thereby maintaining the valve in a closed position. Hence, the handle provides a mechanism whereby pneumatic control of the valve can be overridden solely for the purposes of disabling the valve (that is, to stop the flow of fluid). By contrast, the flow of fluid through the valve is enabled only when the handle is in a manually enabled position and a pneumatic opening signal is present. This aspect of the combination manual/pneumatic valve is significant from a safety aspect, since it does not allow manipulation of the valve to override the safety interlock circuits that function by disabling the pneumatic signal.

The housing 13 is also equipped with an air inlet 41 and an air exhaust 43 which can be alternatively brought into open communication with a central passageway 45 disposed in the shaft 27 by rotation of the handle 31. The central passageway is in open communication with the portion of the expansion chamber disposed below the piston. When the handle 31 is in a manually enabled position as shown in FIG. 2—that is, when the central passageway is in open communication with the air inlet, and when there is no air signal (i.e., air pressure sufficient to displace the piston against the spring is not applied) at the air inlet—the compressive force exerted by the spring 35 against the piston 33 causes the actuator to press against the diaphragm, hence maintaining the valve in a closed position.

When the handle 31 is in a manually enabled position as shown in FIG. 3—that is, when the central passageway is in open communication with the air inlet 41, and an air signal is present (i.e., sufficient air pressure is applied at the air inlet)—pneumatic pressure is applied to the spring loaded piston 33, by way of the central passageway 45. So long as the force exerted by this pneumatic pressure is greater than the expansive force exerted by the spring 35, the spring will be compressed, the piston will be driven into abutment with a stop surface 47 on the shaft, and the actuator 29 will be withdrawn along its longitudinal axis. This, in turn, allows the diaphragm 23 to expand and bring the fluid inlet 19 and outlet 21 into open communication with each other, thereby permitting a flow of fluid through the valve chamber.

In valves of the type depicted, the diaphragm is typically driven upward by at least two forces. The first is that the pressure of the fluid in the inlet 19 or outlet 21 imposes an upward force on the diaphragm. The second is that the diaphragm's resting shape is usually concave downwards, so that it flexes unless it is being forced down against the valve seat 25. With respect to this latter feature, it is to be noted that, in some embodiments, the actuator 29 is not connected to the piston 33 by a means that allows the piston 33 to pull the actuator 29. In these embodiments, the upward motion of the piston 33 may simply allow the actuator 29 to be moved upward by the flexion of the diaphragm.

As shown in FIG. 4, when the handle 31 is in a manually disabled position—that is, when the handle is manually rotated such that the central passageway 45 is in open communication with the air exhaust 43—the pressure in the expansion chamber is at ambient pressure even if a pneumatic signal is present at air inlet 41. Moreover, the advancement of the shaft 27 along the longitudinal axis as the handle 31 is rotated into a disabled position drives the actuator 29 against the diaphragm 23. Consequently, the valve is disabled by the longitudinal displacement of the shaft that precludes the piston being moved away from the diaphragm by the pneumatic signal.

The combination manual/pneumatic valve 11 may be lockable in the disabled position using a padlock, a cable, or other available locking devices (not shown). Hence, the valve may function as a Lock Out Tag Out (LOTO) device. Moreover, to ensure safety in case of failure in the fluid control components upstream of the manual valve, the valve may also be designed to withstand an inlet pressure of at least 3000 PSIA in the disabled position without allowing fluids to pass through the valve for 72 hours (irreversible damage to the valve is reasonable in this unlikely scenario).

It will be appreciated from the above description that the valve can be disabled manually or closed pneumatically, though manual disablement is independent of the pneumatic input state. Hence, the valve can be opened pneumatically to allow the flow of fluid, only if it is manually in the enabled position, and the valve can also be disabled manually to stop the flow of fluid, even if a pneumatic signal to open is present. This feature of the valve is highly advantageous from both an emergency shut-off and maintenance aspect.

Figure 5:
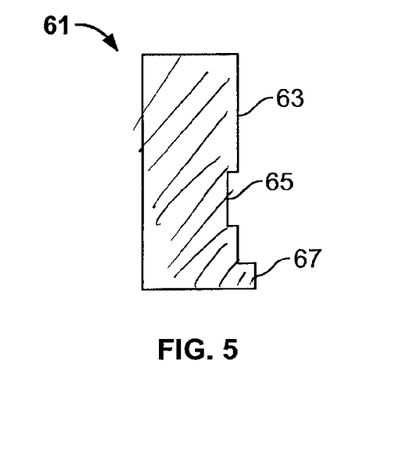
FIG. 5 is a schematic illustration of a stem/handle interface in accordance with the teachings herein.

FIG. 5 illustrates the shaft/handle interface 61 of the combination valve disclosed herein. This interface would typically be disposed inside the threaded male cylinder 37 in the combination manual/pneumatic valve depicted in FIGS. 2-4. The interface may be machined onto, or soldered onto, one end of the shaft 27 in the valve of FIGS. 2-4. The handle has a hollow cylindrical underbody which is adapted to mate with a complimentary shaped male member (shaft/handle interface FIG. 5) that protrudes from the shaft 27 of the valve of FIGS. 2-4. The interface is also provided with an aperture 65 which is adapted to receive an Allen screw or other fastening device for securing a handle to the interface.

The shaft/handle interface 61 of FIG. 5 is advantageous in that it can be provided on each component of the fluid panel that requires a handle, thus allowing the fluid panel to be readily standardized so that the same handle can be used to operate each component of the panel. This also allows each component fitted with the interface to be easily retrofitted and standardized as a LOTO device. The dimensions of the features on the shaft/handle interface 61 of FIG. 5 can vary.

The combination manual/pneumatic valve described above in reference to FIGS. 2-4 has several important safety advantages over many existing valves. One of these safety advantages relates to the use of the combination valve to provide Lockout/Tagout (AKA, LOTO, Hazardous Energy Isolation (HEI)). For example, reduction in fluid panel size could be obtained by placing a conventional lockable, manually-operated valve in the pneumatic control line to the valves, and this would permit the disabling of pneumatic control in a manner that would arguably meet the regulatory requirements for Lockout/Tagout devices. However, this approach is flawed in that the energy isolation could be subverted by connecting (deliberately or accidentally) another source of actuating pressure to the process fluid valve. For example, an accidental connection could be the result of an attempt to connect a control line to a different valve, or from the connection of the manually operated valve to a process chemical valve other than the one the person intended to isolate.

In addition, overriding the pneumatic control signal of a normally disabled valve leaves the valve in a state in which it relies on the spring force being greater than the force applied to the underside of the diaphragm by the fluid to keep the valve disabled. Valves can be made in accordance with the teachings herein that eliminate these flaws by disconnecting the pneumatic control within the valve assembly (preventing cross connection of control lines) and by providing a rigid mechanical linkage that applies closing force to the diaphragm (reducing the dependence on spring pressure to overcome the opening force applied by the gas). Notably, the opening force applied by a fluid of a given pressure at the valve outlet is approximately an order of magnitude greater than the opening force applied by a fluid of the same pressure on the fluid inlet. Consequently, the valves which rely on a spring to maintain closure are subject, when disabled, to reverse flow at much lower pressure than that at which they are subject to forward flow.

Another safety advantage is that the combination of the manual override and pneumatic actuation into a single valve renders moot the competition for first (closest to the point of connection to the fluid supply) position between pneumatic and manual valves. The manual valves, as described previously, are used to isolate the downstream fluid panel elements and the process chamber from the fluid supply. The safety advantage of placing the manual valve first is that it is then positioned to isolate all of the other elements of the fluid panel from the supply. This minimizes the chance of accidental release (either from component failure or human error) by minimizing the number of components that are still connected to the supply.

The pneumatic valves serve a different safety function. They may be used as the actuating elements of several interlock circuits that, in response to various conditions, disconnect the fluid supply from the elements of the fluid panel downstream of them and from the process chamber. Among the sensors in such interlock circuits are fluid detectors. If the detectors sense a leak and remove the actuating signal from a valve, control of the flow through the leak depends on whether the leak is upstream or downstream of the valve which is no longer being actuated. Therefore, it is advantageous in many applications to have the pneumatic valve that is the actuating element for such interlocks as far upstream in the assembly as possible. Consequently, the manual and pneumatic valves "compete" for the first position. As noted above, the combination valve described herein renders this matter moot, as the same valve is subject to control by both means.

Figure 6:
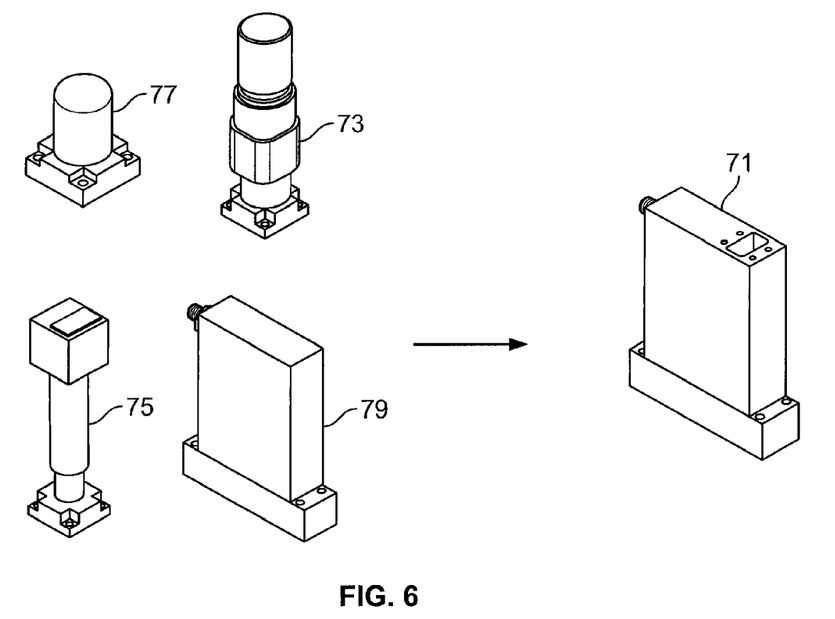
FIG. 6 is an illustration of the functionalities combined into a mass flow controller made in accordance with the teachings herein.

The combination manual/pneumatic valve described above and illustrated in FIGS. 2-4 enables significant reductions in process fluid control assembly length and fluid panel size by combining the functionalities of a pneumatic valve and manual shut-off valve into a single component. However, it has also been found that even further reductions in the length of the process fluid control assembly and in the size of the fluid panel can be obtained, without adversely affecting the serviceability of the fluid panel or process fluid control assembly and the modularity thereof, through modifications to the MFC. The resulting MFC is referred to herein as a "Pressure Insensitive MFC" (PIMFC). As seen in FIG. 6, the PIMFC 71 combines into a single unit the functionalities of a pressure regulator 73, pressure transducer 75, filter 77, and MFC 79 as those elements are found in a conventional process fluid control assembly such as that shown in FIG. 1. The PIMFC is described in greater detail below.

Figure 7:
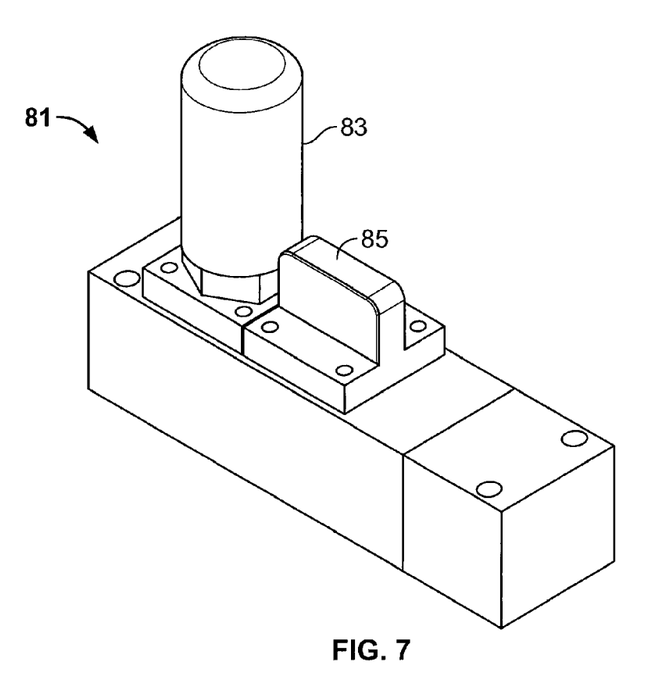
FIG. 7 is a functional illustration showing the fluid path of a conventional thermal-based mass flow controller.

FIG. 7 is a functional illustration of a conventional thermal-based MFC 81. The MFC consists primarily of a control valve 83 and a thermal flow sensor 85. The use of an MFC of this type necessitates the use of a pressure regulator to eliminate "crosstalk", that is, pressure perturbations in the supply line supplying fluid to a first process fluid control assembly that can occur when a second process fluid control assembly operating from the same fluid source is brought online. Crosstalk commonly occurs when the second process fluid control assembly is supplying the fluid at a significantly higher pressure than the first fluid control assembly. Such pressure perturbations cause the MFC controlling the first process fluid control assembly to temporarily register an indicated fluid flow rate that is substantially different (typically much lower) than the actual flow rate.

Figure 9:
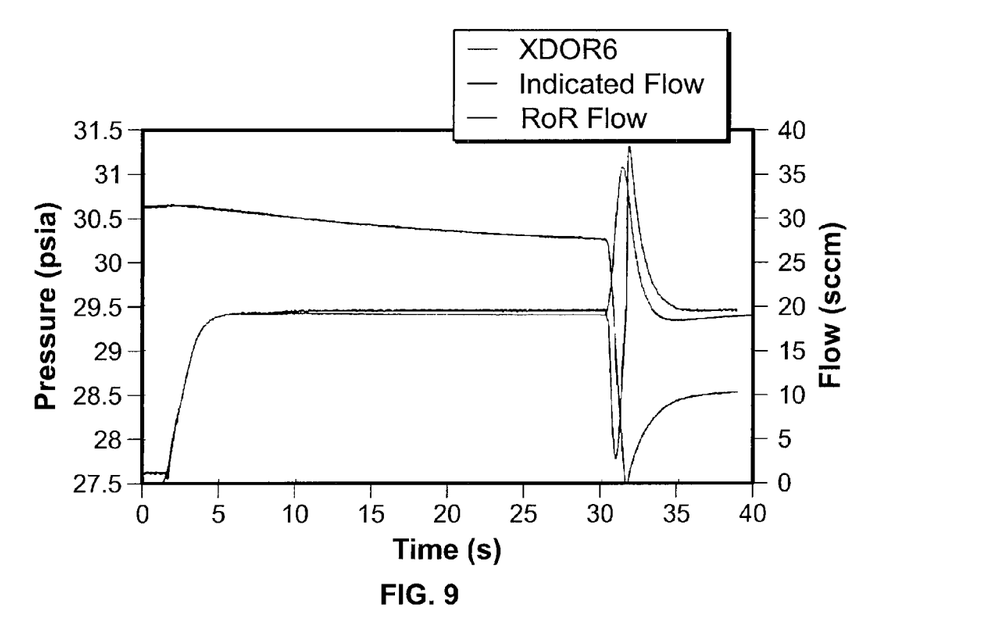
FIG. 9 is a graph illustrating crosstalk in a conventional fluid panel.

The effect of crosstalk in a process fluid control assembly controlled by a conventional MFC (and without the aid of a regulator) is shown in the graph of FIG. 9. This graph was generated on a test station using a stimulus MFC to create a pressure perturbation of about 3 psi (20.7 MPa). The curve denoted "XDOR6" indicates pressure in the fluid line as a function of time as measured by a pressure transducer. The curve denoted "indicated flow" is the fluid flow through the process fluid control assembly as indicated by the MFC, while the curve denoted "ROR" is the Rate of Rise flow, a standard measurement of the actual fluid flow in the fluid control assembly.

After the initial perturbation of about 3 psi (20.7 MPa), the pressure perturbation relaxed to a pressure difference of about 2 psi (13.8 MPa). However, during the initial perturbation, the difference in indicated and actual fluid flow at the MFC was about 3 sccm. This demonstrates the tendency of the MFC, in the absence of a pressure regulator, to overcompensate for the initial pressure drop in the fluid supply at the process fluid control assembly inlet by ramping up the actual flow rate. The use of pressure regulators is thus necessitated with conventional MFCs of this type. The pressure regulator functions by controlling crosstalk by dampening out the pressure perturbations giving rise to crosstalk. This, in turn, allows the indicated flow rate to more closely track the actual flow rate.

Figure 8:
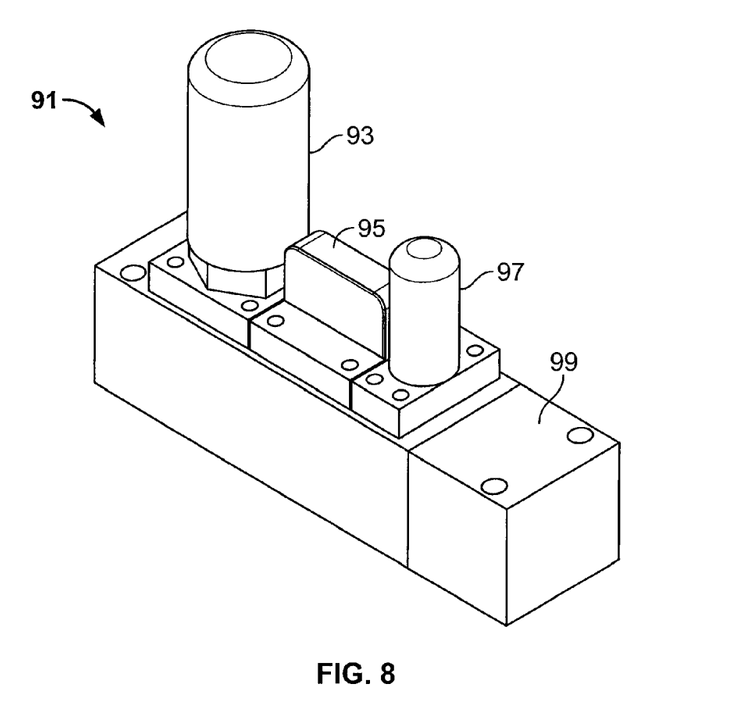
FIG. 8 is a schematic illustration of the fluid path of a mass flow controller made in accordance with the teachings herein.

FIG. 8 is a functional illustration of a PIMFC 91 made in accordance with the teachings herein. The specific details of the components of the PIMFC may vary significantly from one product to another, and have been omitted for purposes of clarity. However, these components are individually well understood in the art, and hence one skilled in the art will appreciate various specific implementations from the functional presentation of these components here.

As with the conventional MFC illustrated in FIG. 7, the PIMFC also contains a control valve 93 and a thermal flow sensor 95. However, the PIMFC additionally contains a pressure sensor 97 and a filter 99. The pressure sensor is upstream of the flow sensor and can be tied into the control loop operating the control valve. Consequently, the PIMFC can rapidly compensate for any changes in the inlet pressure through suitable manipulation of the valve. Since the PIMFC is thus adapted to deal with pressure perturbations in the fluid control assembly, the need for a separate regulator is eliminated. Moreover, since the filter 99 in a conventional process fluid control assembly exists primarily to filter out from the fluid stream debris created by the pressure regulator before the fluid stream enters the MFC, the need for a stand-alone filter is also eliminated. Consequently, the filter may be simplified and incorporated directly into the PIMFC 91 to protect the sensors and actuators from particulate accumulation generated elsewhere upstream. Also, since the PIMFC already contains a pressure sensor, there is no need for an external pressure transducer, and the display functionalities associated with the pressure transducer may be incorporated directly into the PIMFC (that is, the PIMFC may be provided with a display to indicate the pressure already being measured by the pressure sensor).

Figure 10:
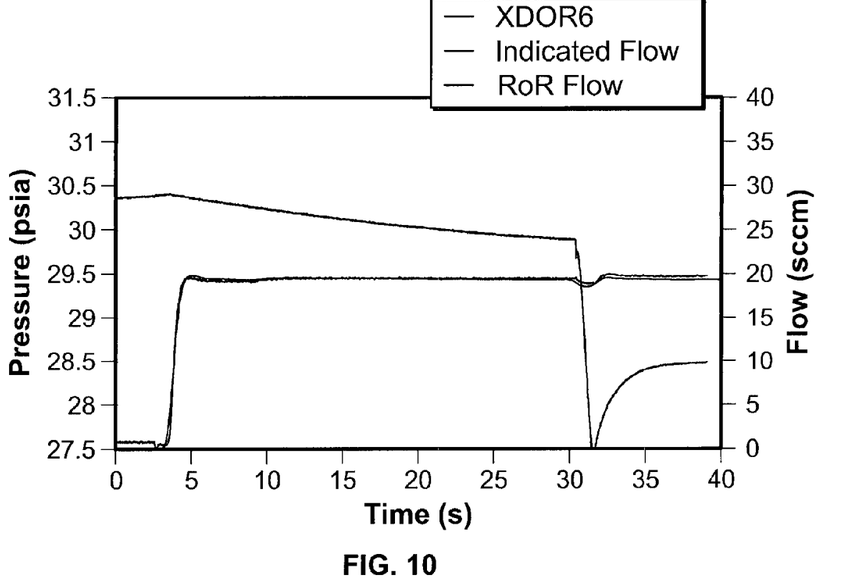
FIG. 10 is a graph illustrating the elimination of crosstalk through the use of a mass flow controller made in accordance with the teachings herein.

FIG. 10 illustrates the effectiveness of the PIMFC disclosed herein in eliminating crosstalk in a process fluid control assembly without the use of an external pressure regulator. As with the conventional MFC that was the subject of the graph in FIG. 8, the PIMFC was subjected to an initial pressure perturbation of about 3 psi (20.7 MPa), after which the pressure perturbation relaxed to a pressure difference of about 2 psi (13.8 MPa). However, unlike the conventional MFC, the PIMFC closely tracked the actual fluid flow rate through the process fluid control assembly during the entire perturbation. This demonstrates that the PIMFC, unlike a conventional MFC, will not overcompensate for pressure perturbations, and hence does not require the use of a separate pressure regulator.

Figure 11:
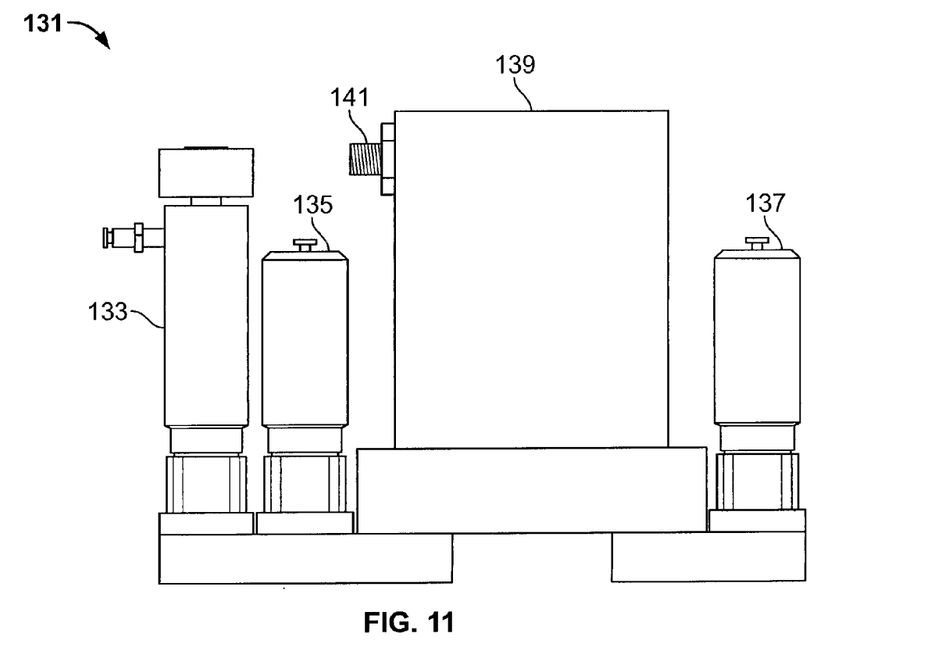
FIG. 11 is a schematic illustration of a process fluid control assembly configuration made in accordance with the teachings herein.

FIG. 11 illustrates a process fluid control assembly 131 made in accordance with the teachings herein which is suitable for use with toxic fluids and which incorporates the combination manual/pneumatic valve and PIMFC described above. The process fluid control assembly comprises a combination manual/pneumatic valve 133 of the type illustrated in FIGS. 2-4, first 135 and second 137 pneumatic valves, and a PIMFC 139. The first 135 and second 137 pneumatic valves allow the flow of fluid to be remotely turned on and off by sending an electronically controlled pneumatic signal (pressurized air) to both pneumatic valves. A communications port 141 is provided on the mass flow controller to allow it to be accessed and controlled remotely. This communications port, which may be adapted to accept wires, optical cables, and other such communications means, may be situated on various surfaces of the mass flow controller and may have various configurations.

In contrast to the conventional process fluid control assembly of FIG. 1, which requires a pressure regulator 105, pressure transducer 107, and filter 109, in the process fluid control assembly 131 of FIG. 11, the pressure regulator has been eliminated and the functionalities of the remaining elements have been combined into the PIMFC 139 as described above. Consequently, pneumatic valve 113 of FIG. 1 is no longer required, since the aforementioned elements can be isolated for purging or maintenance in the process fluid control assembly of FIG. 11 via the first 135 and second 137 pneumatic valves. Furthermore, pneumatic valve 111 of FIG. 1 has been combined into the manual/pneumatic valve 133 in the process fluid control assembly of FIG. 11, also as described above. Therefore, the process fluid control assembly of FIG. 11 is sufficiently more compact than the conventional process fluid control assembly of FIG. 1. This compact design also simplifies pallet design for the fluid panel and reduces the cost thereof. Moreover, because the process fluid control assembly of FIG. 11 has fewer components than conventional process fluid control assemblies such as that shown in FIG. 1, Mean Time Before Failure (MTBF) is higher for the entire system, and thus maintenance costs are reduced.

The process fluid control assembly 131 of FIG. 11 is adapted for use with toxic fluids such as chlorine. However, one skilled in the art will appreciate that the principles herein may also be extended to process fluid control assemblies adapted for use with inert fluids. This may be accomplished, for example, by modifying the process fluid control assembly of FIG. 11 through the elimination of pneumatic valves 135 and 137.

Figure 12:
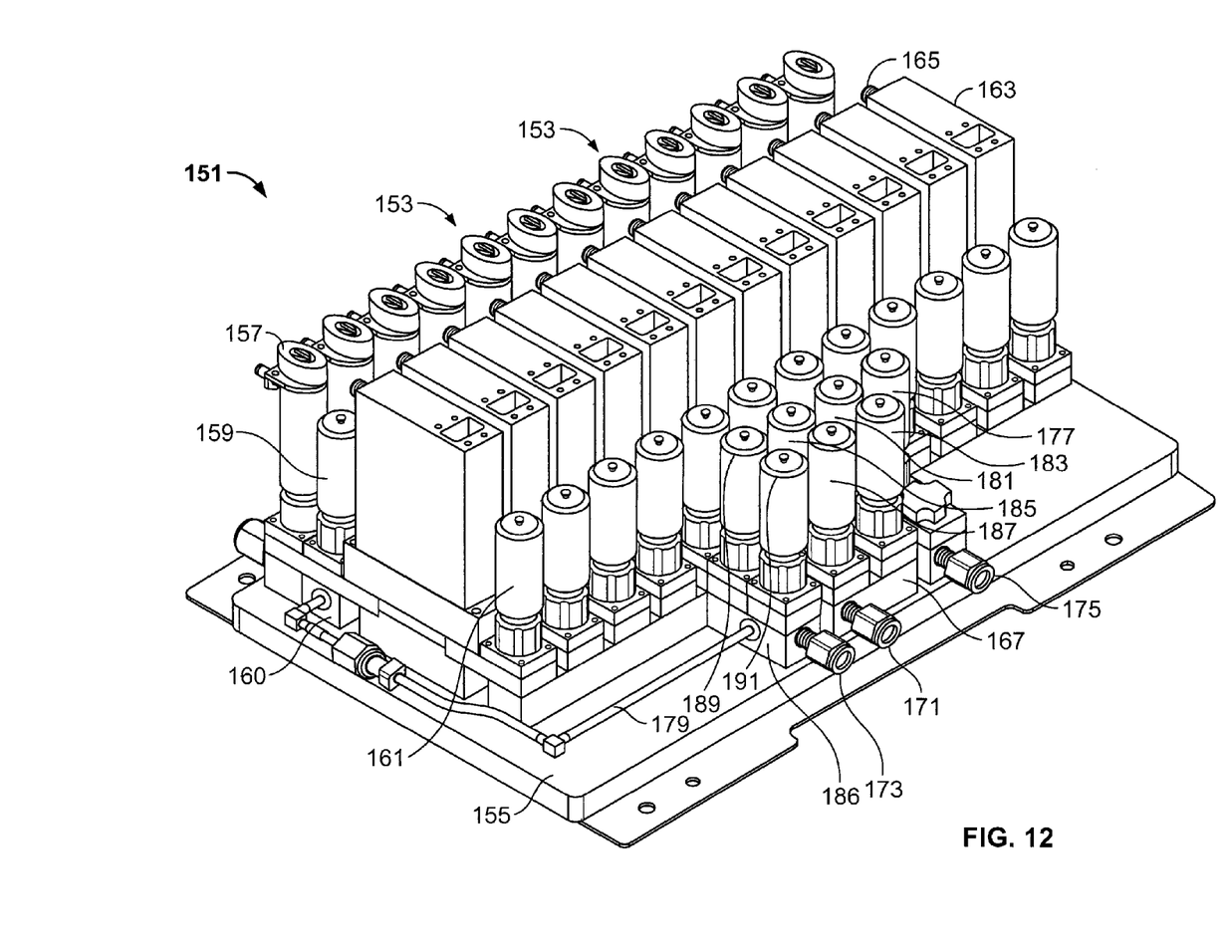
FIG. 12 is an illustration of a fluid pallet made in accordance with the teachings herein.

FIG. 12 depicts one non-limiting example of a fluid panel 151 which incorporates a series of process fluid control assemblies 153 of the type depicted in FIG. 11. In a typical configuration, some of the process fluid control assemblies (typically the first six, going from left to right) control toxic, corrosive or flammable fluids, and the remainder of the process fluid control assemblies control the flow of inert fluids. These two types of process fluid control assemblies are referred to herein as toxic process fluid control assemblies and inert process fluid control assemblies, respectively.

Each of the process fluid control assemblies is supported on a common pallet 155 and comprises a combination manual/pneumatic valve 157 (of the type illustrated in FIGS. 2-4), first 159 and second 161 pneumatic valves, and a PIMFC 163 equipped with a communication port 165. The fluid panel further includes a main manifold 167 where various process fluids under the control of individual process fluid control assemblies can be mixed to form a fluid stream. The fluid stream exits the main manifold via the main manifold outlet 171, from which it can be directed to a process chamber (not shown) or other end use device.

The main manifold is provided with a fluid inlet 173 and a fluid outlet 175 that allow it to be flushed with an inert fluid such as $N_2$ for maintenance purposes or to clear it of residual toxic fluids. The fluid flow through fluid inlet 173 and fluid outlet 175 may be controlled by purge valve 177, in addition to one or more of the other valves on the main manifold. A fluid line 179 is provided through which the main manifold 167 and a purge manifold 160, the latter of which is disposed under the set of first pneumatic valves 159, can be brought into open communication, thus allowing the PIMFCs 163 to be isolated for maintenance or other purposes.

The main manifold 167 is provided with a first, second and third pair of valves that respectively consist of first 181, second 185 and third 189 inlet valves and first 183, second 187 and third 191 outlet valves. The first 183 and second 187 outlet valves are pneumatically coupled, with the first outlet valve operating to control the flow of inert fluids from the inert process fluid control assemblies into the main manifold, and the second outlet valve operating to control the flow of toxic fluids from the toxic process fluid control assemblies into the main manifold. Thus, for example, the first six process fluid control assemblies (from left to right) may be under control of the second outlet valve 187, and the next six process fluid control assemblies may be under control of the first 183 outlet valve. Hence, when the first 183 and second 187 outlet valves are both enabled, the fluid streams from any enabled inert process fluid control assemblies will mix with the fluid streams from any enabled toxic process fluid control assemblies inside of the main manifold 167 and the resulting mixed fluid stream will exit the main manifold through the main manifold outlet 171.

The fluid panel 151 is further provided with pass-through valves 181 and 185. These pass-through valves, which are kept enabled during normal operation of the fluid panel, cooperate with the first 183 and second 187 outlet valves, respectively, to regulate the flow of fluid through the pump/purge manifold 186 and to allow for bidirectional pumping and purging of the fluid panel.

The third outlet valve 191 on the fluid panel regulates the flow of fluid through inlet 173 for purging and maintenance of the fluid panel. Similarly, the third inlet valve 189 regulates the flow of fluid into the pump/purge manifold 186 for purging and maintenance purposes. Thus, for example, if the third inlet valve 189 is disabled and the third outlet valve 191 is enabled, then fluid can be made to flow through fluid line 179 and subsequently through the purge manifold 160 under the set of first pneumatic valves 159 so that toxic fluids can be purged from the toxic process fluid control assemblies.

The principles disclosed herein have been described primarily with reference to combination manual/pneumatic valves and to the use of such valves in process fluid control assemblies. However, it will be appreciated that the manual/pneumatic actuators described herein have a number of applications that extend beyond process fluid control assemblies. For example, such actuators could be employed in various latching systems, such as those used in industrial and high security settings. In such applications, the manual/pneumatic actuators would maintain the latch in a closed position (and therefore maintain a door, hatch or other device under control of the latch in a closed position) unless a pneumatic signal is present. Moreover, even if a pneumatic signal is present, the manual/pneumatic actuator would allow for manual override of the pneumatic signal for safety, security, or maintenance purposes.

More generally, the principles disclosed herein may be applied to devices in which an energy input is provided to cause the movement of one or more movable components of the device. Such devices may be modified in accordance with the teachings herein to effect, as the result of a single manipulation of a manual control, the disconnection of the energy input and the engagement of a mechanical means of keeping the movable component (or components) from moving. Specific, non-limiting examples of such modified devices include valves in which the energy input is a control signal that allows a hazardous material to flow, and latches in which the energy input is a control signal which allows access to a hazardous area. The modified device could also be a manual valve that controls actuation air to a pneumatically powered device (e.g., a gate valve), and that includes a mechanism that, in the disabled state, engages a mechanical lock on the pneumatically powered device, precluding movement of one or more pneumatically driven components of the device.

It will also be appreciated that, while the principles disclosed herein have been frequently illustrated in reference to pneumatically actuated devices, these principles are also applicable to devices having various other energy inputs and actuating signals. Such energy inputs include, but are not limited to, electrical and fluid (e.g., hydraulic) signals.

A combination manual/pneumatic actuator has been described herein. A combination manual/pneumatic valve has also been described herein that utilizes such an actuator and that combines the functionalities of a manual valve and a pneumatic valve into a single valve. This combination valve allows for reductions in the length of process fluid control assemblies and of fluid panels incorporating these process fluid control assemblies, without any loss in functionality, ease of serviceability and modularity. Fluid panel configurations that make advantageous use of the shortened process fluid control assemblies have also been provided.

All the features disclosed in this specification (including any accompanying claims, abstract and drawings), and/or all of the steps or any method or process so disclosed, may be combined in any combination, except combinations where at least some of the features and/or steps are mutually exclusive. Each feature disclosed in this specification (including any accompanying claims, abstract and drawings) may be replaced by alternative features serving the same equivalent or similar purpose, unless expressly stated otherwise. Thus unless expressly stated otherwise, each feature disclosed is one example only of a generic series of equivalent or similar features. Moreover, although a specific embodiment is specifically illustrated and described herein, it will be appreciated that modifications and variations of the invention are covered by the above teachings and within the purview of the appended claims without departing from the spirit and intended scope of the invention.

What is claimed is:

1. A combination manual/pneumatic valve for a fluid control assembly, the valve comprising:
    a housing;
    a valve chamber disposed in said housing, said valve chamber having a fluid inlet and a fluid outlet;
    a pneumatically driven actuator adapted to move the valve, in response to a pneumatic signal, between a first state in which flow of fluid between the fluid inlet and the fluid outlet is stopped, and a second state in which flow of fluid between the fluid inlet and the fluid outlet is permitted;
    a handle adapted to move said valve from the second state into the first state, regardless of whether the pneumatic signal is present at the actuator,
    an expansion chamber;
    an inlet within the housing adapted to receive the pneumatic signal, and
    an outlet within the housing, the outlet connected to atmosphere,
    wherein
    the inlet is different from the outlet, and
    the handle is movable to allow only one of the inlet or the outlet to be in communication with the expansion chamber.

2. The valve of claim 1, wherein said handle is movable between a first position and a second position, and wherein said actuator is adapted to move said valve from the first state to the second state only when the handle is not in the second position.

3. The valve of claim 1, further comprising a diaphragm and a valve seat, and wherein the diaphragm is pressed against the valve seat when the valve is in said first state, thereby preventing the flow of fluid between the fluid inlet and fluid outlet.

4. The valve of claim 3, wherein the expansion chamber has a piston therein which is adapted to press the diaphragm against the valve seat when no pneumatic signal is present at said actuator.

5. The valve of claim 4, wherein the outlet is adapted to bring said expansion chamber to atmospheric pressure when said outlet is brought into open communication with said expansion chamber.

6. The valve of claim 5, wherein said handle is movable between a first position and a second position, and wherein the piston is adapted such that the presence of the pneumatic signal withdraws the piston from the diaphragm only when the handle is not in the second position.

7. The valve of claim 6, wherein said outlet is in open communication with said expansion chamber when the handle is in said second position.

8. The valve of claim 4, wherein said piston allows the diaphragm to move from a position in which it is pressed against the valve seat, to a different position, by advancing along a longitudinal axis in a first direction in response to the pneumatic signal.

9. The valve of claim 3, further comprising a spring adapted to maintain a compressive force on said diaphragm.

10. The valve of claim 1, wherein said handle is equipped with a threaded cylinder that rotatingly engages a complementarily threaded aperture in said housing.

11. The valve of claim 5, wherein the inlet is adapted to introduce pressurized air into said expansion chamber, and the outlet is adapted to exhaust said expansion chamber.

12. The valve of claim 11, wherein said handle has a shaft that is equipped with a passageway defined by first and second apertures that are in open communication with each other, and wherein said first aperture is in open communication with said expansion chamber.

13. The valve of claim 12, wherein said second aperture is adjustable, by rotation of said handle, from a first position in which it is in open communication with said inlet, to a second position in which it is in open communication with said outlet.

14. The valve of claim 1, wherein the handle is movable between an enable position and a disabled position, and wherein in the enable positioned said valve is movable between the first state and the second state in response to the pneumatic signal and in the disabled position the valve is held in the first state regardless of the pneumatic signal.

15. The valve of claim 1, wherein the inlet is an air inlet and the outlet is an air outlet.

* * * * *